US012419216B2

(12) United States Patent
Siemer

(10) Patent No.: US 12,419,216 B2
(45) Date of Patent: Sep. 23, 2025

(54) APPARATUS FOR ASSISTING THE EXCHANGE OF BLADES ON MOWERS

(71) Applicant: CLAAS Saulgau GmbH, Bad Saulgau (DE)

(72) Inventor: Alfred Siemer, Apen/Godensholt (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 428 days.

(21) Appl. No.: 18/299,035

(22) Filed: Apr. 11, 2023

(65) Prior Publication Data

US 2023/0320268 A1 Oct. 12, 2023

(30) Foreign Application Priority Data

Apr. 12, 2022 (DE) .......................... 102022108861.8

(51) Int. Cl.
*A01D 34/73* (2006.01)
(52) U.S. Cl.
CPC ......... *A01D 34/733* (2013.01); *A01D 34/736* (2013.01)
(58) Field of Classification Search
CPC ............................. A01D 34/733; A01D 34/736
See application file for complete search history.

(56) References Cited

U.S. PATENT DOCUMENTS

| 3,320,733 | A | * | 5/1967 | Kirk ........................ A01D 34/63 56/295 |
| 3,662,529 | A | * | 5/1972 | Glunk .................. A01D 34/736 56/295 |
| 3,958,402 | A | * | 5/1976 | Bouet .................. A01D 34/733 56/295 |
| 4,956,905 | A | * | 9/1990 | Davidson ............. A01D 34/001 29/213.1 |
| 5,678,804 | A | * | 10/1997 | Lintelman ............... B66F 15/00 254/133 R |
| 5,826,857 | A | * | 10/1998 | Brack ..................... B66F 15/00 254/8 R |
| 5,971,360 | A | * | 10/1999 | Sinsley .................. B66F 3/005 254/8 B |
| 6,829,878 | B1 | * | 12/2004 | Hoffman ............. A01D 34/736 56/295 |
| 8,209,837 | B1 | * | 7/2012 | Henshaw ........... B25B 23/0085 29/283 |
| 9,545,053 | B2 | * | 1/2017 | Fay, II ................. A01D 34/733 |

(Continued)

FOREIGN PATENT DOCUMENTS

DE 19856746 A1 7/2000
DE 102015120062 A1 5/2017

*Primary Examiner* — Claude J Brown

(57) ABSTRACT

Apparatus (10) for assisting the exchange of blades on a mowing member of a mower having a mowing disk, a blade carrier and at least one blade mounted on the blade carrier via a pin connected to the blade carrier and extends through a recess in the mowing disk, a lever device (11) having at one end an actuating handle (14) actuatable by hand, and has at a second end at least one bending-open body (15, 16), the blade carrier and the mowing disk being able to be displaced such that the pin connected to the blade carrier can be moved out of the recess, a support device (12) mounted in an articulated manner on the lever device (11) and supported on the mowing disk during a bending-open process, and at least one spring element (13) assists the bending-open process via the at least one bending-open body (15, 16).

11 Claims, 5 Drawing Sheets

(56) References Cited

U.S. PATENT DOCUMENTS

| | | | | |
|---|---|---|---|---|
| 10,172,282 B2* | 1/2019 | Svensson | ............ | A01D 34/733 |
| 2003/0024221 A1* | 2/2003 | Williams | ............ | A01D 34/001 |
| | | | | 56/1 |
| 2009/0236574 A1* | 9/2009 | Smith | .................... | B66F 3/005 |
| | | | | 254/134 |
| 2011/0194885 A1* | 8/2011 | Whitenight | .......... | A01D 34/736 |
| | | | | 403/11 |
| 2013/0247530 A1* | 9/2013 | Heinrich | ............. | A01D 34/733 |
| | | | | 56/295 |
| 2014/0126952 A1* | 5/2014 | Fay, II | ................ | A01D 34/736 |
| | | | | 56/255 |
| 2014/0208710 A1* | 7/2014 | Roth | .................... | A01D 34/733 |
| | | | | 56/255 |
| 2015/0289447 A1* | 10/2015 | Reichen | ................ | A01D 34/64 |
| | | | | 56/295 |
| 2015/0313078 A1* | 11/2015 | Fay, II | ................ | A01D 34/736 |
| | | | | 7/164 |
| 2018/0065218 A1* | 3/2018 | White | ................ | B25B 23/0085 |
| 2020/0352095 A1* | 11/2020 | Jerez | .................... | A01D 34/733 |

\* cited by examiner

APPARATUS FOR ASSISTING THE EXCHANGE OF BLADES ON MOWERS

The invention relates to an apparatus for assisting the exchange of blades on mowers according to the preamble of claim 1.

A mower which serves for mowing grass is disclosed in DE 198 56 746 A1. Such a mower is also denoted as a rotary mower. Mowers which serve for mowing grass have at least one cutter bar, wherein a plurality of mowing members are mounted on each cutter bar. Each mowing member is mounted on a cutter bar cover of the respective cutter bar, wherein each mowing member comprises a mowing disk, a blade carrier and at least one blade. The or each blade of the respective mowing member is mounted on the respective blade carrier of the respective mowing member via a pin which is connected to the blade carrier and which extends through a recess in the mowing disk. The blade carrier is preferably a leaf spring, wherein for changing the or each blade, the blade carrier can be displaced relative to the mowing disk in order to move the respective pin out of the respective recess in the mowing disk and thus in order to be able to remove the respective blade from the respective pin. DE 198 56 746 A1 discloses an apparatus for assisting the exchange of blades.

According to DE 198 56 746 A1 the apparatus for assisting the exchange of blades on a mowing member of a mower comprises a holder and a crossmember, wherein the crossmember is able to be introduced between the blade carrier and the mowing disk of the respective mowing member. The holder of the apparatus for assisting the exchange of blades provides a lever arm, a manual force being able to be manually exerted thereby on the apparatus in order to displace the blade carrier and the mowing disk relative to one another, by utilizing the lever action via the crossmember of the apparatus for assisting the exchange of blades which is positioned between the blade carrier and the mowing disk.

Due to this displacement of the blade carrier and the mowing disk relative to one another, these components can be spread or bent open, wherein the pin which is connected to the blade carrier can be moved out of the recess in the mowing disk. The crossmember of the apparatus for assisting the exchange of blades on a mowing member of a mower, which is disclosed in DE 198 56 746 A1, can be denoted as a spreading body or bending-open body which is exclusively actuated manually by utilizing the lever action, by applying a manual force on the holder of the apparatus.

A further apparatus for assisting the exchange of blades on a mowing member of a mower is disclosed in DE 10 2015 120 062 A1. The apparatus disclosed therein is electrically assisted by external force. A bending-open device which can be introduced between the blade carrier and the mowing disk of the respective mowing member is electrically actuated to this end by external force. The apparatus for assisting the exchange of blades requires an electric motor for this purpose.

There is a need for an apparatus for assisting the exchange of blades on mowers which has a simple construction and which permits a simple exchange of blades without requiring an electric motor. Proceeding therefrom, the object of the present invention is to provide a novel apparatus for assisting the exchange of blades on mowers.

This object is achieved by an apparatus according to claim 1. The apparatus according to the invention comprises a lever device which has at one end an actuating handle which can be actuated by hand and which has at a second end at least one bending-open body, the blade carrier and the mowing disk of the respective mowing member being able to be displaced thereby relative to one another such that, for performing the exchange of blades, the pin which is connected to the blade carrier can be moved out of the recess in the mowing disk. The apparatus according to the invention also comprises a support device which is mounted in an articulated manner on the lever device and which is supported on the mowing disk during a bending-open process. The apparatus according to the invention also comprises at least one spring element which assists the bending-open process via the at least one bending-open body.

The apparatus according to the invention has at least one spring element. The respective spring element acts, on the one hand, on the lever device which can be actuated by hand and, on the other hand, on the support device which is mounted in an articulated manner on the lever device. The respective spring element assists the bending-open process, wherein the support device is supported on the mowing disk during the bending-open process. The apparatus according to the invention has a simple construction and permits a simple exchange of blades without requiring an electric motor.

Preferably, the support device has at least one support body with a first support limb and a second support limb, wherein either the first support limb or the second support limb is supported on one respective side, and namely on one respectively different or another side, of the mowing disk as a function of the relative position between the lever device and the support device. This permits a particularly advantageous and simple exchange of blades.

Preferably, the lever device has two levers which are arranged at a spacing from one another and which are connected at the first end of the lever device via the actuating handle, wherein each lever has in each case at least one bending-open body at the second end of the lever device. The support device preferably has two support bodies which are arranged at a spacing from one another and which are connected via a cross bar. Preferably, a first support body of the support device is mounted in an articulated manner on a first lever of the lever device and a second support body of the support device is mounted in an articulated manner on a second lever of the lever device. Preferably, a first spring element acts in an articulated manner with a first end on the first lever and acts in an articulated manner with a second end on the first support body, wherein a second spring element acts in an articulated manner with a first end on the second lever and acts in an articulated manner with a second end on the second support body. This construction of the apparatus according to the invention is particularly preferable. The blade carrier can be displaced relative to the mowing disk in a simple manner and with a low expenditure of force. The two spring elements assist this bending-open process.

Preferably, a joint is positioned between the second end of the respective spring element and the support device as a function of the relative position between the lever device and the support device, either on a first side or on a second side of a straight line extending through the joint between the first end of the respective spring element and the lever device and through a joint between the support device and the lever device. During the bending-open process, the joint between the second end of the respective spring element and the support device changes its position relative to this straight line, which extends through the joint between the support device and the lever device and through the joint between the spring element and the lever device. Either the first support limb or the second support limb is supported on the mowing disk as a function of this relative position. When the second support limb is supported from above on the mowing disk, the further bending-open of the mowing member is advantageously assisted by the respective spring element. The spring element can maintain the relative position between the lever device and the support device, without the operator having to actuate the lever device. The operator then has both hands free for an exchange of blades.

Preferably, the respective spring element is a gas pressure spring. A gas pressure spring is particularly preferred in order to assist a bending-open process.

Preferably, the lever device comprises at the second end at least one roller and/or at least one ball as the bending-open body. Such bending-open bodies are particularly preferred for a simple and reliable bending-open process.

Preferred developments of the invention are found in the dependent claims and the description. Exemplary embodiments of the invention are explained in more detail with reference to the drawing without being limited thereto. In the drawing:

FIG. 1 shows a detail of a mower, in particular a rotary mower which serves for mowing grass, in particular, in the region of a mowing member 1 of the mower.

Figure 1:
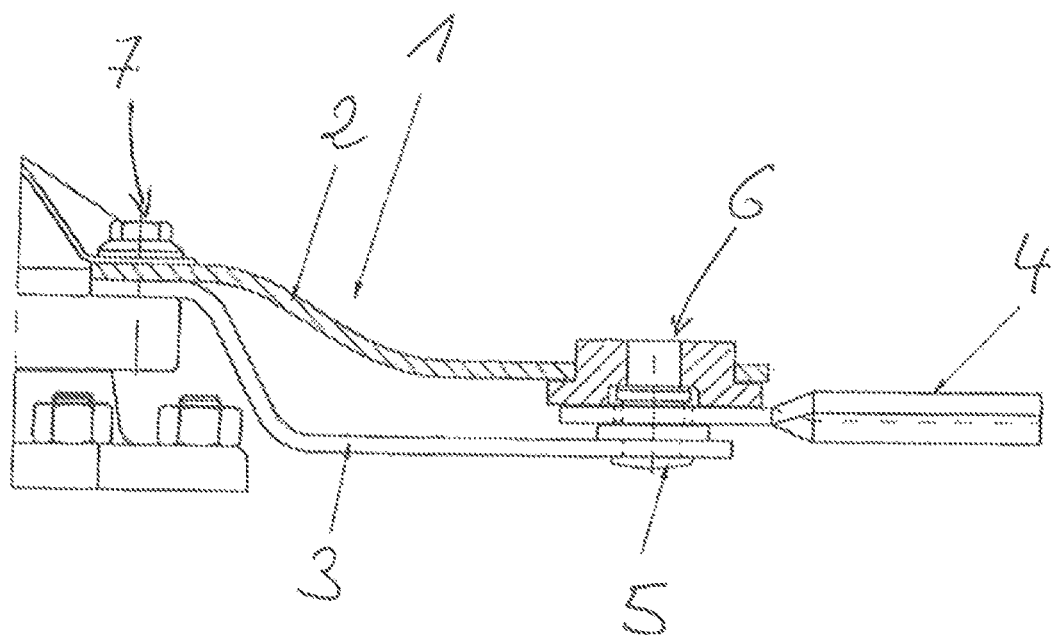
FIG. 1 shows a detail of a cross section through a mowing member of a mower.

The mowing member 1 has a mowing disk 2, a blade carrier 3 and preferably two blades 4. The number of blades 4 is purely by way of example. The blades 4 are fastened to the blade carrier 3 and namely in each case via a pin 5 which is fixedly connected to the blade carrier 3, and on which the respective blade 4 is received. The pin 5 extends through a recess 6 in the mowing disk 2.

For performing an exchange of blades, the respective pin 5 can be moved out of the recess 6 in the mowing disk 2 by bending open the blade carrier 3 relative to the mowing disk 2, in order then to remove a worn blade 4, for example, from the pin 5 and to replace it for a new blade. According to FIG. 1 the blade carrier 3 and the mowing disk 2 of the respective mowing member 1 are screwed together via a screw connection 7, wherein the blade carrier 3, the blades 4 and the mowing disk 2 of the mowing member 1 rotate when the mowing member 1 rotates. The blades 4 are displaced radially outwardly by centrifugal forces.

As set forth above, for performing an exchange of blades on the mowing member 1, shown in FIG. 1, the blade carrier 3 and the mowing disk 2 have to be bent open or spread relative to one another in order to move the pin 5, which receives the blade 4 to be replaced, out of the recess 6 in the mowing disk 2 and thus to make the blade 4 to be replaced accessible for an exchange of blades. The invention proposes an apparatus for assisting the exchange of blades on a mower 1, this bending-open or spreading of the blade carrier 3 and the mowing disk 2 being able to be carried out thereby in a simple and reliable manner.

Figure 2:
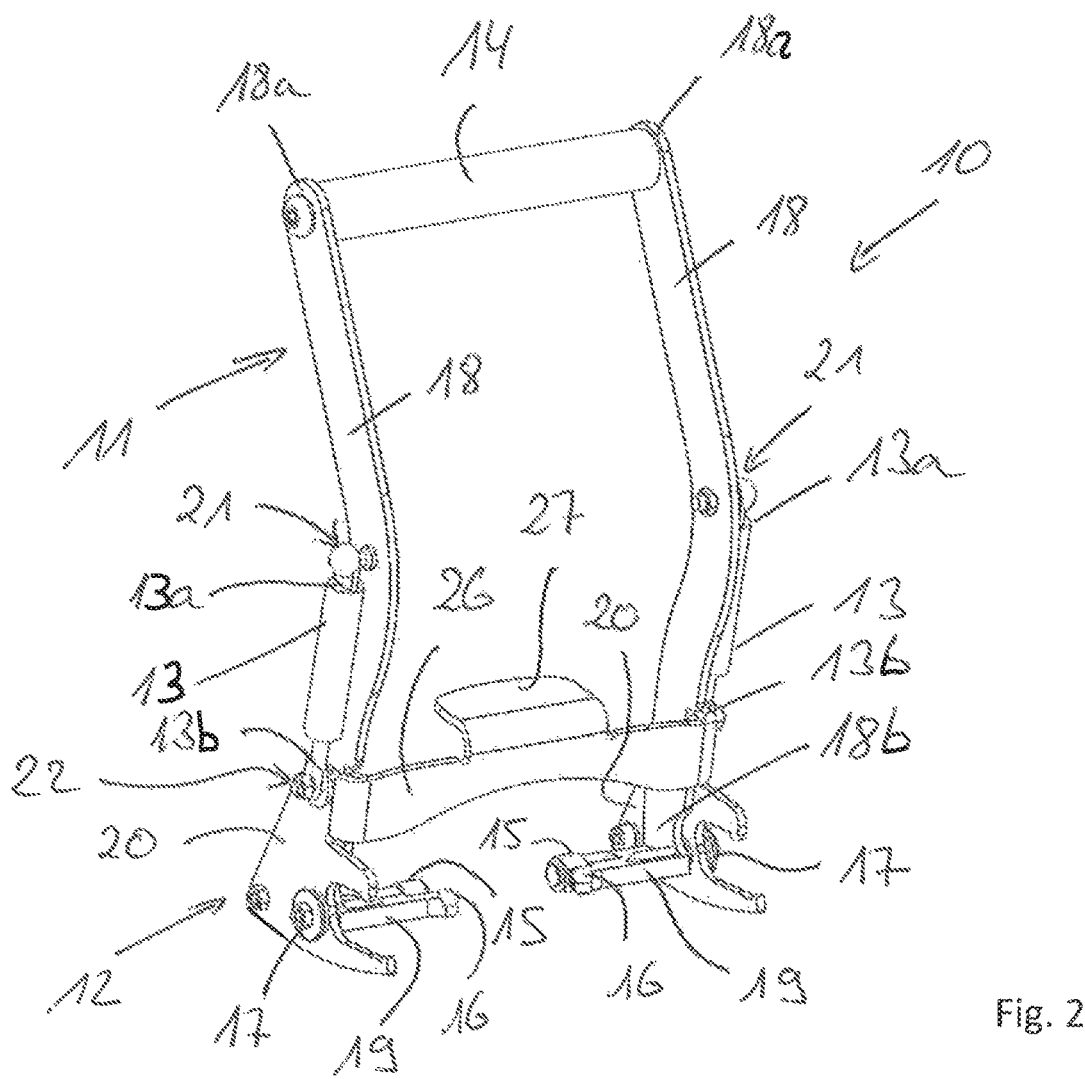
FIG. 2 shows a perspective view of an apparatus according to the invention for assisting the exchange of blades on a mowing member of a mower in a first state.

FIG. 2 shows a perspective view of an apparatus 10 according to the invention for assisting the exchange of blades on a mowing member 1 of a mower. The apparatus 10 according to the invention has a lever device 11, a support device 12 and at least one spring element 13.

The lever device 11 has at one end an actuating handle 14 which can be actuated by hand, and at a second end at least one bending-open body 15, 16. The lever device 11 is able to be positioned between the blade carrier 3 and the mowing disk 2 via the at least one bending-open body 15, 16, wherein the blade carrier 3 and the mowing disk 2 of the respective mowing member 1 can be displaced relative to one another via the at least one bending-open body 15, 16 such that, for performing the exchange of blades, the pin 5 which is connected to the blade carrier 3 can be moved out of the recess 6 in the mowing disk 2.

The support device 12 is mounted in an articulated manner on the lever device 11, namely via at least one joint 17.

The support device 12 is supported on the mowing disk 2 during the bending-open process.

The at least one spring element 13 assists the bending-open process via the at least one bending-open body 15, 16.

In the exemplary embodiment shown, the lever device 11 has two levers 18 which are arranged at a spacing from one another. The levers 18 have a curved path with two opposing ends 18a, 18b. The two levers 18 are connected together at their first ends 18a via the actuating handle 14. At the second ends 18b, the levers 18 respectively have at least one bending-open body 15, 16 which is rigidly fastened to a support 19 arranged at the respective second end 18b.

The supports 19 of the two levers 18 face one another and, starting from the respective lever 18, extend in the direction of the respective other lever 18, wherein the bending-open bodies 15, 16 of the two levers 18 which are received at the ends of these supports 19 are spaced apart from one another.

In the exemplary embodiment shown, the support device 12 which is mounted in an articulated manner on the lever device 11 has two support bodies 20 which are arranged at a spacing from one another. The two support bodies 20 are connected together via a cross bar 26. A first support body 20 of the support device 12 is rotatably fastened to a first lever 18 of the lever device 11 via a joint 17. A second support body 20 of the support device 12 is rotatably mounted on a second lever 18 of the lever device 11 via a further bearing 17.

The support bodies 20 are arranged on a side of the respective lever 18 which faces away from the respective other lever 18.

In the exemplary embodiment shown, the apparatus 10 has two spring elements 13.

A first spring element 13 acts in an articulated manner with a first end 13a via a joint 21 on the first lever 18 and in an articulated manner at a second end 13b via a second joint 22 on the first support body 20 of the support device 12.

A second spring element 13 acts in an articulated manner with a first end 13a via a joint 21 on the second lever 18 of the lever device 11 and at an opposing second end 13b via a second joint 22 on the second support body 20.

Figure 3:
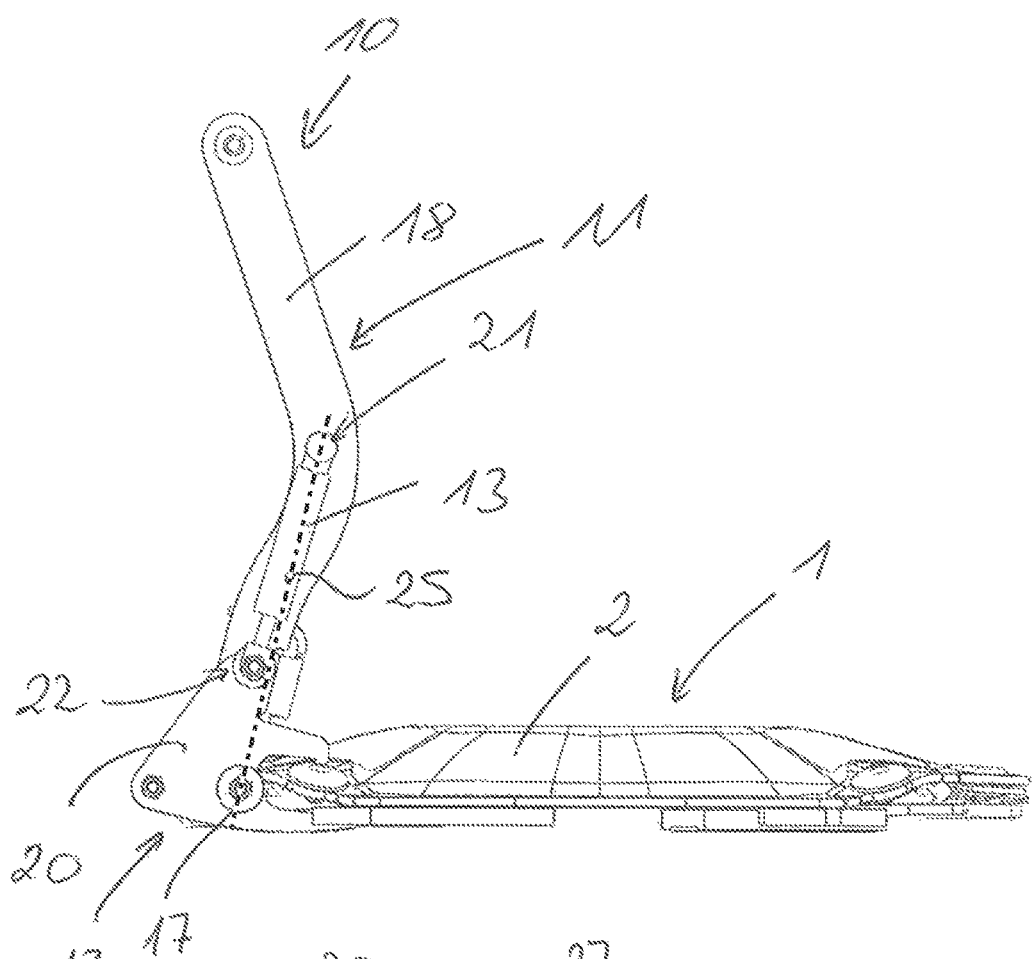
FIG. 3 shows the apparatus of FIG. 2 together with the mowing member of FIG. 1 in a first state of the apparatus according to the invention.
Figure 4:
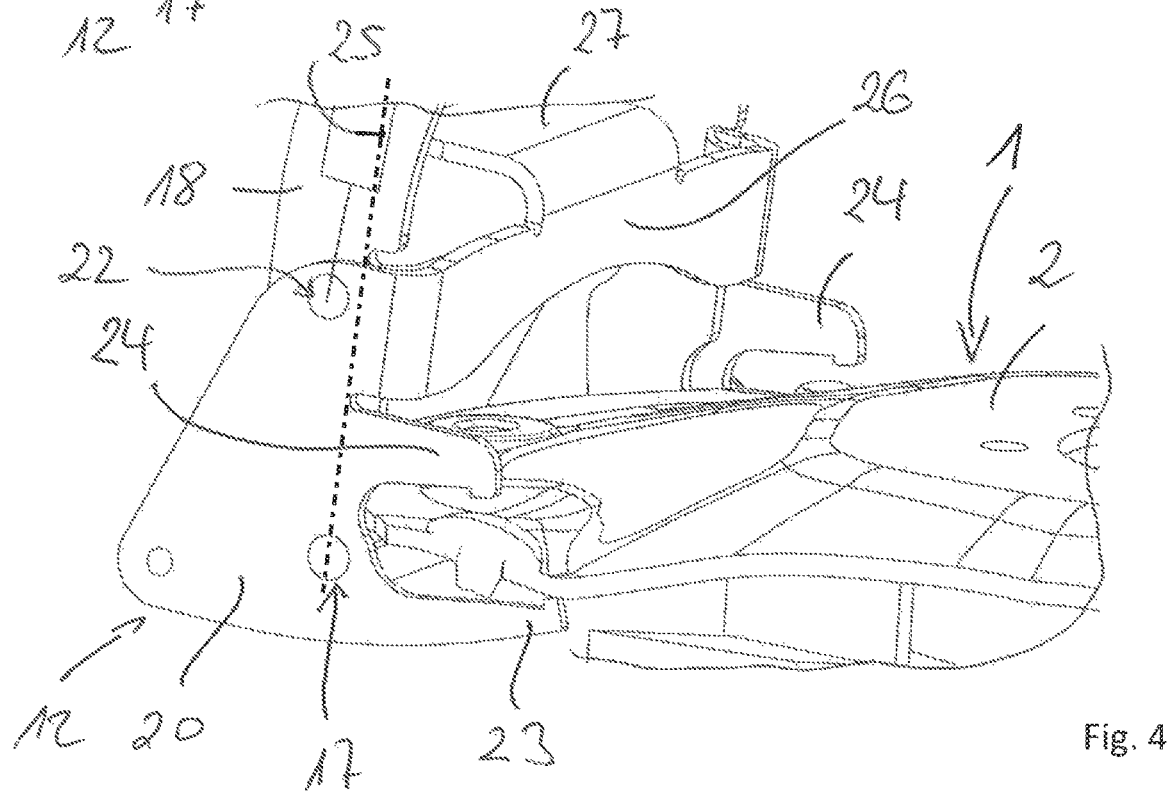
FIG. 4 shows a detail of FIG. 3 in a perspective view.
Figure 5:
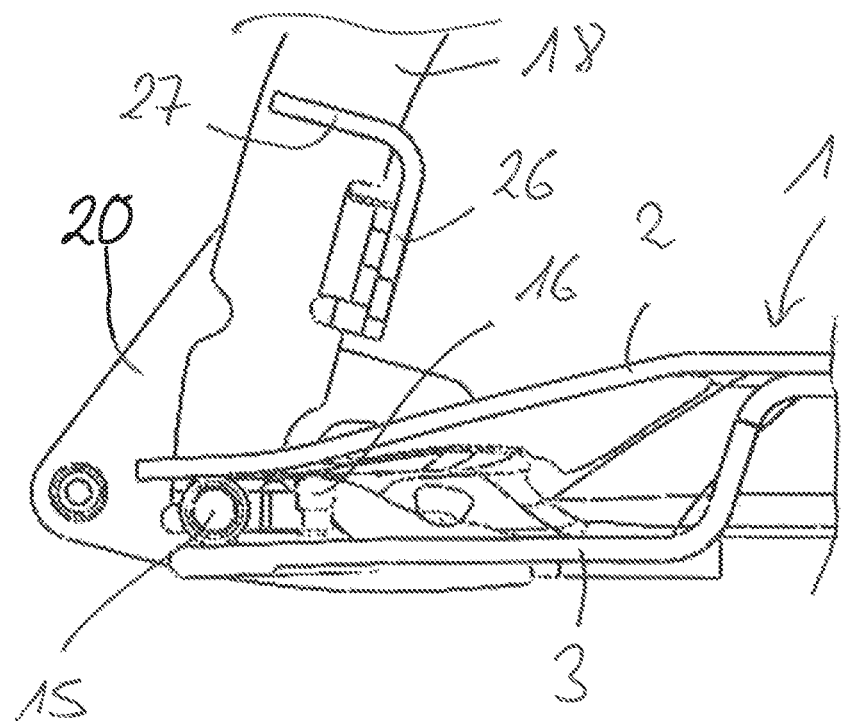
FIG. 5 shows a cross section through the detail of FIG. 4.

FIG. 2 shows the apparatus 10 in an initial position or resting position in which said apparatus is positioned on a mowing member 1 (see FIG. 3). FIGS. 4 and 5 show different details of FIG. 3.

When the apparatus 10 is arranged in its initial position or resting position of FIG. 2 on a mowing member 1 (see FIGS. 3, 4 and 5) the bending-open bodies 15, 16 are inserted between the blade carrier 3 and the mowing disk 2 of the mowing member 1. In this state, the support device 12 is supported with its support bodies 20 on a lower face of the mowing disk 2.

The respective support body 20 of the support device 12 has two support limbs 23, 24. In the initial position or resting position of the apparatus 10 (see FIGS. 2, 3, 4) when the apparatus 10 is positioned on a mowing member 1 for an exchange of blades, the respective support body 20 is supported via a first support limb 23 on a lower face of the mowing disk 2 of the mowing member 1 (see FIG. 4). In this state, the joint 22 is arranged between the second end 13b of the respective spring element 13 and the support device 12 on a first side of a straight line 25, which extends through the joint 21 between the first end 13a of the spring element 13 and the lever 18 and through the joint 17 between the support device 12 and the lever device 11 (see FIG. 3). In this initial position of the apparatus 10, the support limb 23 of the support bodies 20 of the support device 12 supported on the lower face of the mowing disk is arranged on the other side of the straight line 25. In this initial position, the spring elements 13 act such that the levers 18 are pushed by the spring force onto the cross bar 26 and are held there.

Figure 6:
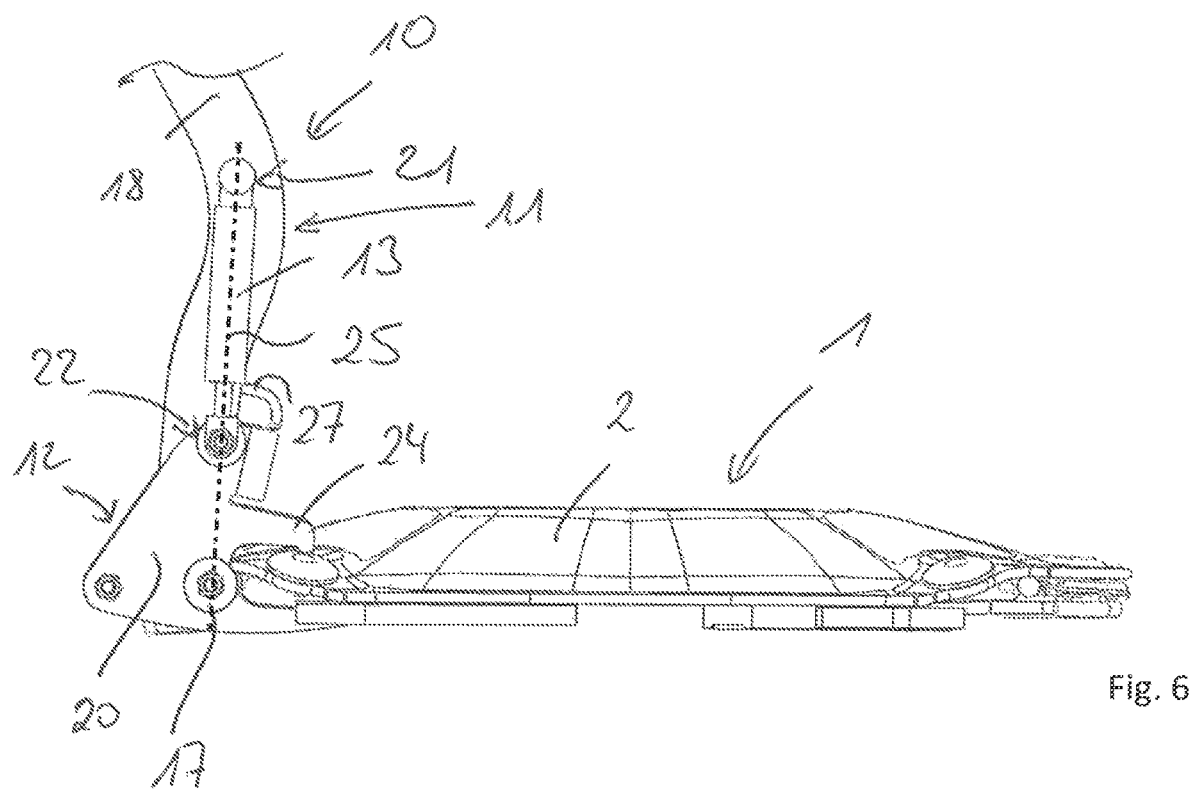
FIG. 6 shows the arrangement of FIG. 3 in a second state of the apparatus according to the invention.
Figure 7:
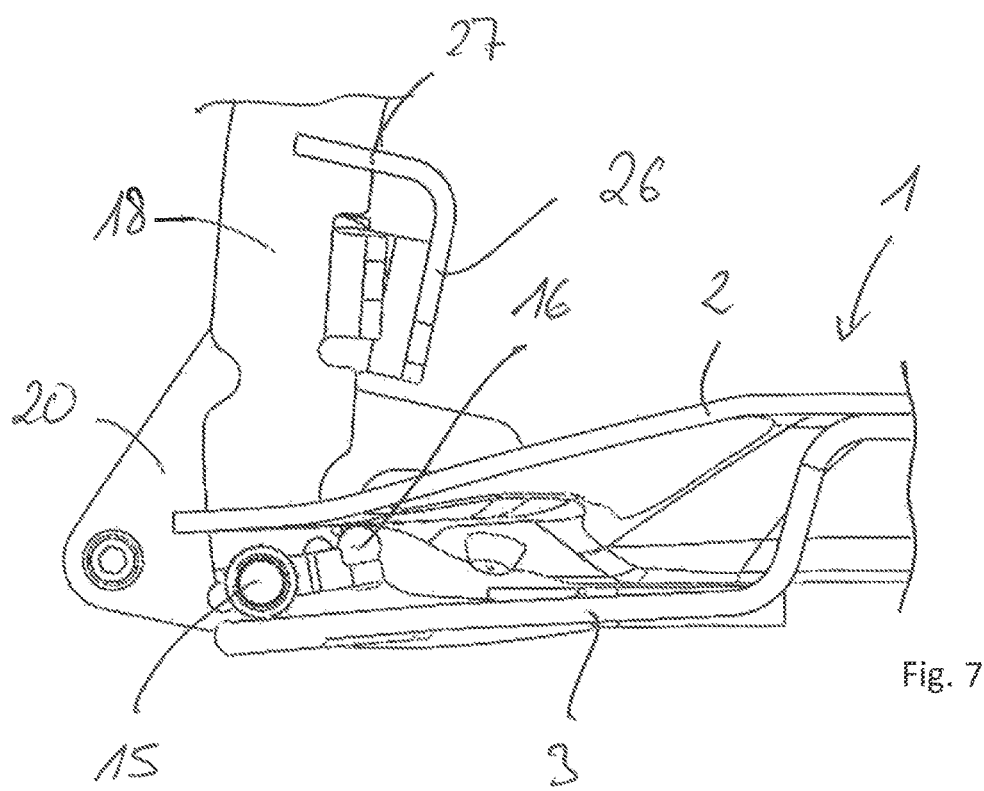
FIG. 7 shows a detail of a cross section through the arrangement of FIG. 6.

FIGS. 6 and 7 show the apparatus 10 in an intermediate position, partially deflected from the initial position or resting position shown in FIGS. 2, 3 and 4, in which the joint 22 which is arranged between the second end 13b of the respective spring element 13 and the respective support body 20 is located on the straight line 25 which extends through the joints 21 and 17. At this position, the force vectors of the spring elements 13 run exactly on the respective straight line 25 so that the force component, which has previously pushed the levers 18 onto the cross bar 26, has disappeared or has become zero. This position can thus also be denoted as the dead center position. At this position, with a further deflection of the levers 18 the support of the support device 12 changes from the lower face of the mowing disk 2 to the opposing upper face thereof. On the upper face, the respective support body 20 of the support device 12 is supported via the respective second support limb 24 on the mowing disk 2.

With a further deflection of the apparatus 10, i.e. with a further relative displacement of the lever device 11 relative to the support device 12, beyond the dead center position shown in FIGS. 6 and 7, a force component of the spring elements 13 is produced which acts in the direction of the further deflection and assists the further deflection of the lever device 11. The respective spring element 13 is supported via the joint 22 on the support body 20, which is supported via the second support limb 24 on the upper face of the mowing disk 2 and assists the deflection movement of the lever 18 by the spring force of the spring element 13.

Figure 11:
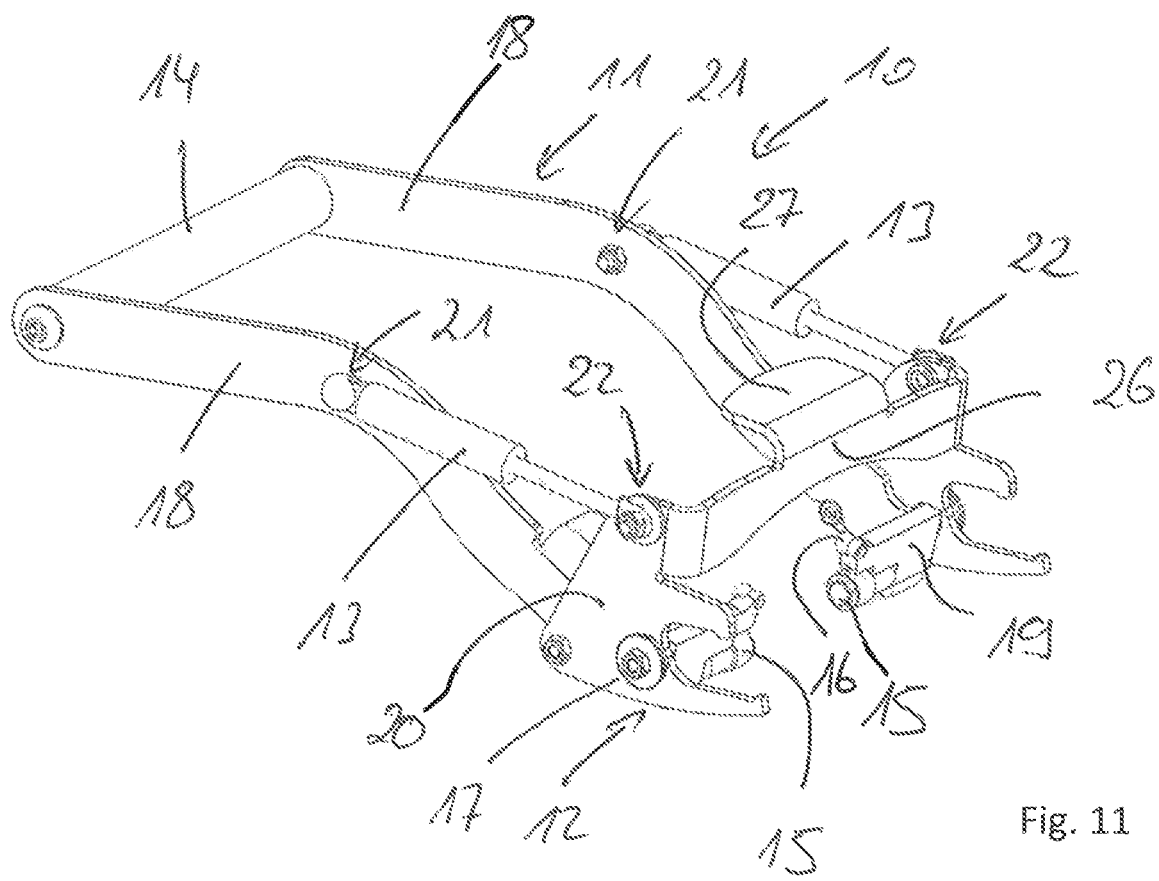
FIG. 11 shows the apparatus according to the invention in the state of FIG. 8 in a perspective view.
Figure 8:
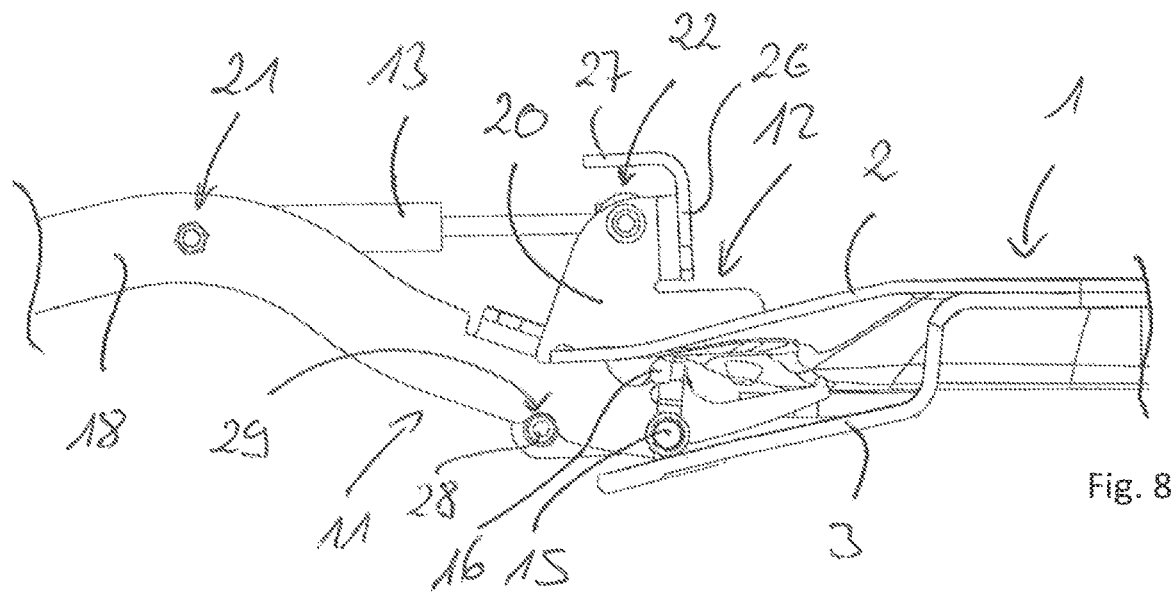
FIG. 8 shows the cross section of FIGS. 5 and 7 in a third state of the apparatus according to the invention.
Figure 9:
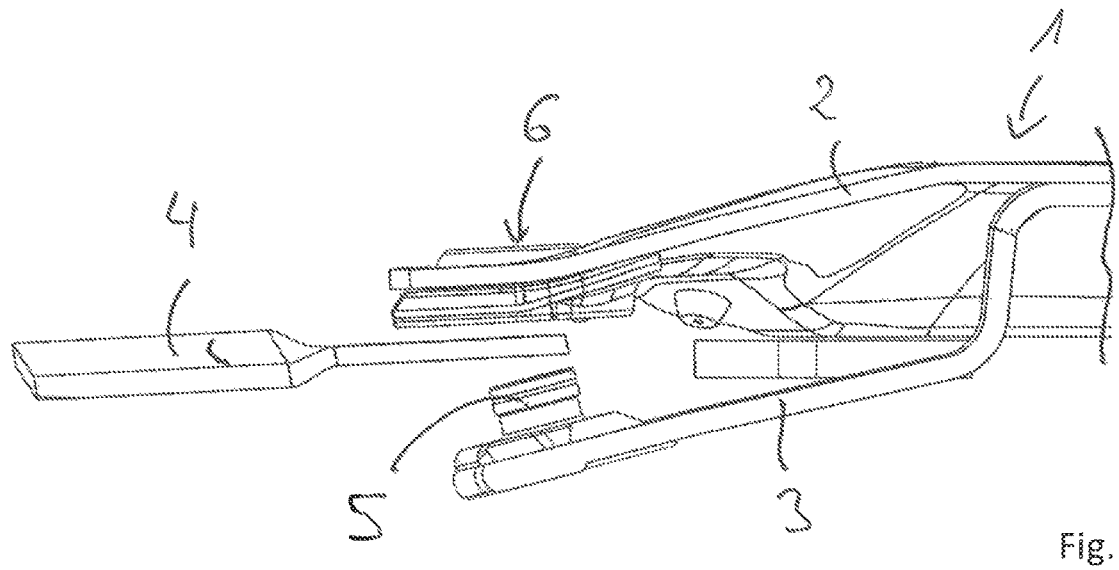
FIG. 9 shows the cross section of FIG. 8 when changing the blade without the apparatus according to the invention.
Figure 10:
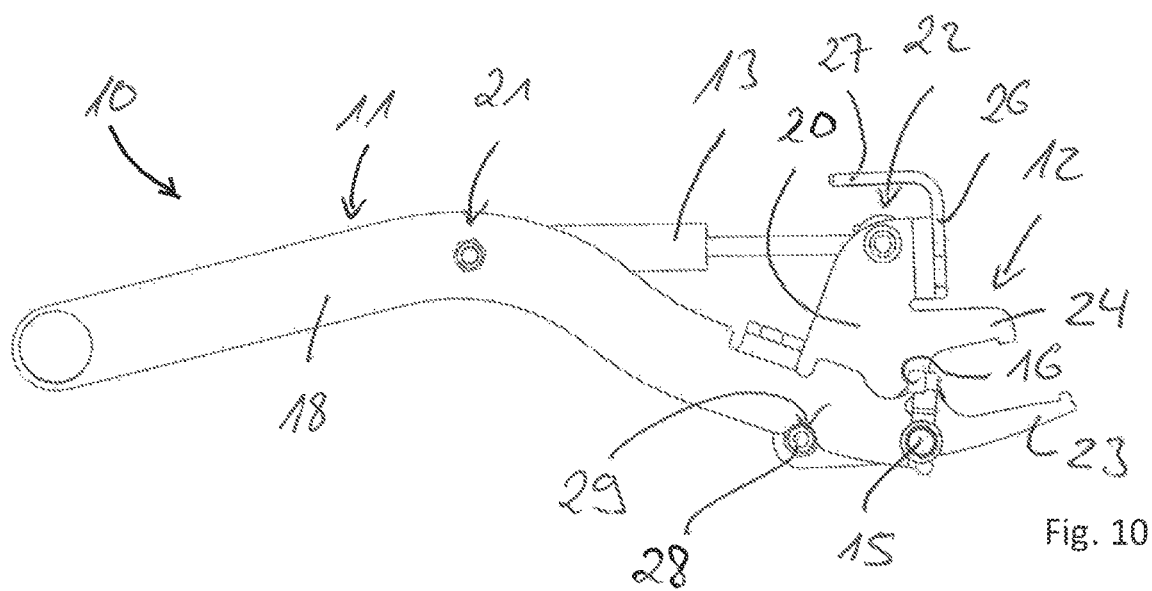
FIG. 10 shows a cross section through the apparatus according to the invention in the state of FIG. 8.

The spring force holds the lever device 11 in the respective intermediate position and in a complete open position or actuating position which is shown in FIG. 8. FIGS. 10 and 11 show the apparatus 10 according to the invention without the mowing member 1 in the state in which it is transferred into a maximum open position. FIG. 9 shows a mowing member 1 with a bent-open blade carrier 3 when changing a blade 4.

The maximum opening of the apparatus 10 or the maximum deflection of the lever device 11 relative to the support device 12, when bending open or spreading a mowing member, is limited by a projection 28 on at least one support body 20 of the support device 12 engaging in a recess 29 on one respective adjacent lever 18 of the lever device 11.

In order to permit the blade carrier 3 to bend open relative to the mowing disk 2 in a particularly advantageous manner when changing the blade, a roller as a first bending-open body 15 and a ball as a second bending-open body 16 are assigned to each lever 18 of the lever device 11 at the second end 18b thereof. The first bending-open body 15, which is configured as a roller, rolls on the blade carrier 3 during a bending-open process. The second bending-open body 16, which is configured as a ball, rolls on the lower face of the mowing disk 2 during a bending-open process. The second bending-open body 16, which is configured as a ball, preferably consists of hardened steel.

As already set forth, the two support bodies 20 of the support device 12 are connected together via the cross bar 26. A holding tab 27, on which the apparatus 10 can be gripped and held by an operator, as is the case of the actuating handle 14, acts on this cross bar 26, in particular when the apparatus 10 is being positioned on a mowing member 1 and is being removed from the mowing member 1.

The apparatus 10 according to the invention permits a simple insertion thereof from the front into a mowing member 1. For a bending-open process only a small force has to be applied by an operator via the actuating handle 14 onto the lever device 11 of the apparatus 10. In the open state, the apparatus 10 is automatically held by the spring elements 13 so that both hands are available for an operator for an exchange of blades. If the bending-open process is terminated after an exchange of blades, and the lever device 11 is pivoted back into its initial position by an operator actuating the actuating handle 14, if a new blade 4 has not been correctly positioned, this then leads to the lever device 11 moving with difficulty, so that an operator then immediately obtains feedback about an incorrect exchange of blades.

Moreover, if a finger is inadvertently jammed, for example, an operator can advantageously react immediately and reverse the operating direction in order to eliminate injury. In the case of an apparatus for the exchange of blades which is actuated by external force, the operator has to actuate the corresponding switching lever as quickly as possible in order to change the direction, wherein this results in a first delay and a further delay until the apparatus has reversed its actuating direction. As a result, there is an increased risk of injury when using an apparatus for the exchange of blades which is actuated by external force.

The spring force which is applied by one or more spring elements 13 is preferably designed such that it corresponds approximately to the effective spring force when bending open the blade carrier 3. As a result, when changing the blade with an apparatus 10 according to the invention the operator only has to apply a small manual force which corresponds to overcoming the frictional forces. In particular, these include frictional forces of the joints of the apparatus 10 and the rolling movement of the bending-open body 16. Due to the balance which is present by this design of the spring element(s) 13 with the spring force of the blade carrier 3, the apparatus 10 is particularly advantageously held in the open position and in the intermediate positions by the frictional forces. The operator thus has both hands free for the exchange of blades and dangerous situations cannot occur due to the lever device 11 springing back, if the operator inadvertently releases the actuating handle 14 during the actuation thereof.

As a result of an incorrect operation—such as for example when a blade is incorrectly inserted—the balance of forces between the spring element 13 and the blade carrier 3 is interrupted and the operating forces rise so sharply that the operator—as already mentioned above—is made clearly aware of the incorrect operation.

LIST OF REFERENCE SIGNS

1 Mowing member
2 Mowing disk
3 Blade carrier
4 Blade
5 Pin
6 Recess
7 Screw connection
10 Apparatus
11 Lever device
12 Support device
13 Spring element
13a First end
13b Second end
14 Actuating handle
15 Bending-open body
16 Bending-open body
17 Joint
18 Lever
18a End
18b End
19 Projection
20 Support body
21 Joint
22 Joint
23 Support limb
24 Support limb
25 Straight line
26 Cross bar
27 Holding tab
28 Projection
29 Recess

The invention claimed is:

1. An apparatus (10) for assisting the exchange of blades on a mowing member (1) of a mower, wherein the respective mowing member (1) comprises a mowing disk (2), a blade carrier (3) and at least one blade (4) which is mounted on the blade carrier (3) via a pin (5) which is connected to the blade carrier (3) and which extends through a recess (6) in the mowing disk (2), comprising a lever device (11) which has at one end an actuating handle (14) which can be actuated by hand, and which has at a second end at least one bending-open body (15, 16), the blade carrier (3) and the mowing disk (2) of the respective mowing member (1) being able to be displaced thereby relative to one another such that, for performing the exchange of blades, the pin (5) which is connected to the blade carrier (3) can be moved out of the recess (6) in the mowing disk (2), comprising a support device (12) which is mounted in an articulated manner on the lever device (11) and which is supported on the mowing disk (2) during a bending-open process, and comprising at least one spring element (13) which assists the bending-open process via the at least one bending-open body (15, 16).

2. The apparatus according to claim 1, characterized in that the lever device (11) has two levers (18) which are arranged at a spacing from one another and which are connected at the first end of the lever device (11) via the actuating handle (14), wherein each lever (18) has at least one bending-open body (15, 16) at the second end of the lever device (11).

3. The apparatus according to claim 2, characterized in that the support device (12) has two support bodies (20) which are arranged at a spacing from one another and which are connected together via a cross bar (26).

4. The apparatus according to claim 3, characterized in that a first support body (20) of the support device (12) is mounted in an articulated manner on a first lever (18) of the lever device (11) and a second support body (20) of the support device (12) is mounted in an articulated manner on a second lever (18) of the lever device (11).

5. The apparatus according to claim 2, characterized in that a first spring element (13) acts in an articulated manner on the first lever (18) and the first support body (20) and a second spring element (13) acts in an articulated manner on the second lever (18) and the second support body (20).

6. The apparatus according to claim 1, characterized in that the support device (12) has at least one support body (20) with a first support limb (23) and a second support limb (24), wherein either the first support limb (23) or the second support limb (24) is supported on one respective side of the mowing disk (2) as a function of the relative position between the lever device (11) and the support device (12).

7. The apparatus according to claim 1, characterized in that the spring element (13) applies, or all of the spring elements (13) apply, a spring force which corresponds approximately to the spring force of the blade carrier (3) when bending open said blade carrier.

8. The apparatus according to claim 1, characterized in that the at least one spring element (13) acts in an articulated manner with a first end on the lever device (11) and acts in an articulated manner with a second end on the support device (12).

9. The apparatus according to claim 8, characterized in that a joint (22) is positioned between the second end of the respective spring element (13) and the support device (12) as a function of the relative position between the lever device (11) and the support device (12), either on a first side or on a second side of a straight line (25) extending through a joint (21) between the first end of the respective spring element (13) and the lever device (11) and through a joint (17) between the support device (12) and the lever device (11).

10. The apparatus according to claim 1, characterized in that the at least one spring element (13) is a gas pressure spring.

11. The apparatus according to claim 1, characterized in that the lever device (11) comprises at the second end at least one roller and/or at least one ball as the bending-open body (15, 16).

* * * * *